Jan. 17, 1933.  O. CORDS  1,894,852
COIL PIECE FOR DEEP SEA SIGNALING CABLES
Filed March 1, 1932
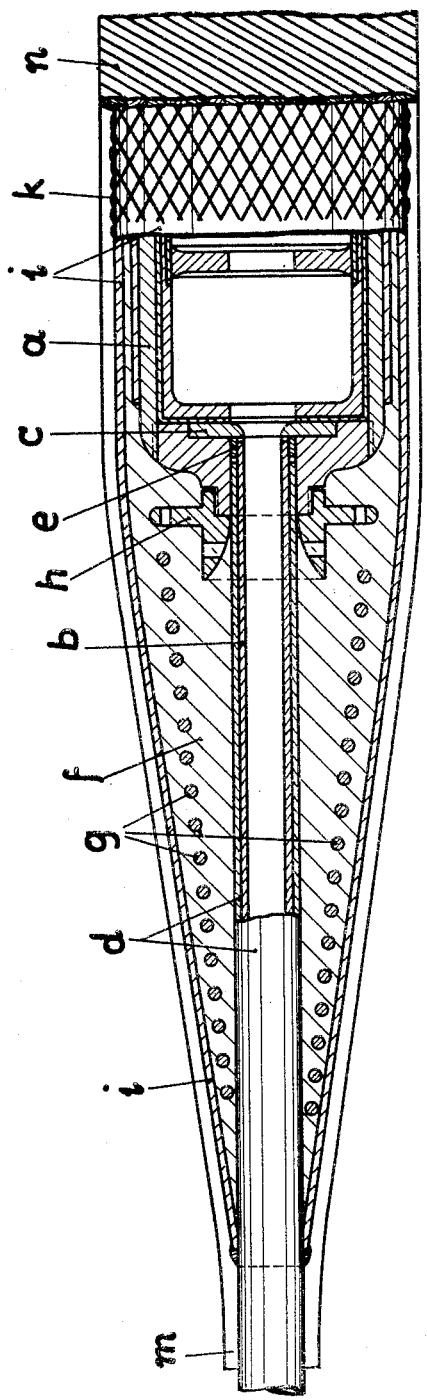
O. Cords
INVENTOR
By: Marks&Clerk
ATTys.

Patented Jan. 17, 1933

1,894,852

UNITED STATES PATENT OFFICE

OTTO CORDS, OF COLOGNE-MULHEIM, GERMANY, ASSIGNOR TO FELTEN & GUILLEAUME CARLSWERK ACTIEN-GESELLSCHAFT, OF COLOGNE-MULHEIM, GERMANY

COIL PIECE FOR DEEP SEA SIGNALING CABLES

Application filed March 1, 1932, Serial No. 596,081, and in Germany June 12, 1931.

This invention relates to deep sea signaling cables especially those which, between the cable core and the lead sheathing, have a pressure protecting tube, for example, of laid light metal wires, and are provided with an armouring lying over the lead sheathing and taking up the tensile stresses.

If such cables are constructed as Pupin cables, special attention must be directed to the construction of the coil housing. On account of the high pressure prevailing in the deep sea, it is necessary to build the Pupin coils in a pressure-tight housing; this must be connected with the cable so as to be sufficiently resistant to tension. The connecting points between the lengths of cable and the coil housings have hitherto caused considerable constructive difficulties. It was first attempted to connect the pressure protecting tube in a rigid and pressure-tight manner with the coil housing and to provide the lead sheathing directly over the connecting point. It has, however, been found that this method of connection did not give satisfactory results. This is easily understood when it is considered that the armouring, which is applied around the sleeve by hand, can stretch to a considerable extent in laying under the tension of the part of the cable which is hanging free on account of twisting or yielding of the individual armouring wires. In this way the pressure protecting tube is suddenly subjected to excessive tensile stress, to which in most cases it cannot resist; the tube will therefore either be torn at the fixing place in the sleeve, or else it will also stretch; in all cases the lead sheathing is not equal to such stresses and breaks at the transition point between the coil housing and the cable. Attempts have further been made to close the end of the cable and the coil housing separately in a water-tight manner by means of a lead sheathing, the connection between the coils and the cable cores then being made, for example, by means of gutta percha cores which have to be lead into the cable ends and the coil housing in a pressure resisting and water-tight manner. In this way there is no lead sheathing at the dangerous transition point which could be subjected to tensile stress, but there is the disadvantage of a complicated method of leading in the cores and insulation.

The invention shows how it is possible to avoid these difficulties. In the coil piece, according to the invention, the pressure protecting the tube is not rigidly fixed in the coil housing but is introduced therein in such a manner that it can move longitudinally to a certain extent. This gives the result that when the armouring is stretched the pressure protecting tube can follow this extension without being subjected to tensile stress; the tensile stresses in this case are taken up exclusively by the armouring.

The water-tight closure of the coil piece is effected by a lead covering, which, at the ends of the coil piece, is lead over running on members, and at the ends of the running on members is welded or soldered to the lead sheathing of the cable. The running on members consist, according to the invention, of a non-compressible but elastic material, for example caoutchouc, and bear against the pressure protecting hollow rope so that a deformation of the lead covering is impossible. Over the lead covering lie the armouring wires embedded in jute, which, in order to avoid excessive extension, are arranged with the greatest possible pitch. If it is desired still further to counteract the extension of the armouring, the armouring wires can be interwoven over the coil housing. It is advisable to use for this purpose not the armouring wires of the cable but special armouring wires, which, at the end of the coil piece, are spliced together with the cable armouring. It is also advisable to provide over the interwoven armouring a closely covering protecting armouring laid with a short pitch, and therefore not subject to tensile stress.

In the coil piece according to the invention, in spite of any extension of the armouring during laying, a breaking of the lead sheath or of the pressure protecting tube need not be feared. The pressure protecting tube can slide freely in the coil housing and the lead covering also will not break because the extension to be taken up by it is distributed over a considerable length on account of the running on members.

In the case of a multi-cored cable the Pupin coils cannot be placed in a single housing in view of the necessary flexibility of the sleeve. According to the invention, a coil piece for such cables consists of several coil housings arranged at short distances, which are connected by a short length of cable with pressure protecting tube and a cylindrical non-compressible filling member lying above the tube (instead of the conical running on members). The lead covering and the armouring are laid over the intermediate pieces in the same manner as over the coil housings. In this way the flexibility of the cable is retained even in a long coil piece.

A coil piece according to the invention is illustrated in the accompanying drawing in a constructional example. The pressure resisting coil housing $a$ has at the ends a guide into which the pressure protecting tube $b$ projects and in which it can slide in the longitudinal direction. In order to prevent the pressure protecting tube from striking against the coils, a separate abutment ring $c$ can be provided. The lead sheathing $d$ of the cable is continued over the pressure protecting tube into the guide of the coil housing, and, at the end of the pressure protecting tube, is replaced by a metal ring $e$, which has the object of holding together the wires forming the pressure protecting tube. The coil housing and the cable ends are completely surrounded by the running on member $f$ in which a supporting spiral $g$ can be provided for strengthening. The collar $h$ of the coil casing provides the necessary hold for the running on member. Over the running on member lies the lead covering $i$, which, at the ends of the coil piece, is soldered to the lead sheathing $d$ of the cable. Over the lead sheathing is the armouring $k$ embedded in jute, which, in the case shown in the figure, is interwoven in the manner of a stocking, and, at the end of the coil piece, is spliced to the armouring $m$ of the cable. The outer closure is formed by the protecting armouring $n$ laid with short pitch which simply has the object of protecting the lead covering of the coil piece against damage from without.

What I claim is:

1. A coil piece for deep sea signaling cables which have pressure protecting tubes between the cable core and the lead sheathing for taking up radial pressure, and armouring over the lead sheathing for taking up tensile stress, comprising a pressure-tight housing in which the Pupin coils are placed, a guide at each end of the housing, the pressure protecting tube and lead sheathing projecting into the housing at each end through the guides and being capable of longitudinal movement, conical running-on members of non-compressible elastic material arranged over the pressure protecting tubes and lead sheathing at each end of the coil housing, and a lead covering surrounding the coil housing and running-on members and secured to the lead sheathing of the cable.

2. A coil piece for deep sea signaling cables, as claimed in claim 1, having two layers of armouring wires over the coil piece, the layer nearest to the lead sheathing consisting of wires interwoven in the manner of a stocking, and the outer layer consisting of a compact protecting armouring of short pitch.

3. A coil piece for multi-cored deep sea signaling cables which have pressure protecting tubes between the cable core and the lead sheathing for taking up radial pressure, and armouring over the lead sheathing for taking up tensile stress, comprising a number of pressure-tight housings in which the Pupin coils are placed, a guide at each end of each housing, short lengths of cable with pressure protecting tubes and lead sheathing between the coil housings, the pressure protecting tubes and lead sheathing projecting into the housings through the guides and being capable of longitudinal movement, conical running-on members of non-compressible elastic material arranged over the pressure protecting tubes and lead sheathing at each end of the coil piece, cylindrical noncompressible members surrounding the short lengths of cable between the housings, and a lead covering surrounding the coil housings, running-on members and cylindrical members and secured to the lead sheathing of the cable.

4. A coil piece for multi-cored deep sea signaling cables as claimed in claim 3, having two layers of armouring wires over the coil piece, the layer nearest to the lead sheathing consisting of wires interwoven in the manner of a stocking, and the outer layer consisting of a compact protecting armouring of short pitch.

In testimony whereof I have signed my name to this specification.

OTTO CORDS.